G. W. VAN STEENBURGH.
SPRING TIRE.
APPLICATION FILED MAR. 6, 1913.
1,103,445.
Patented July 14, 1914.
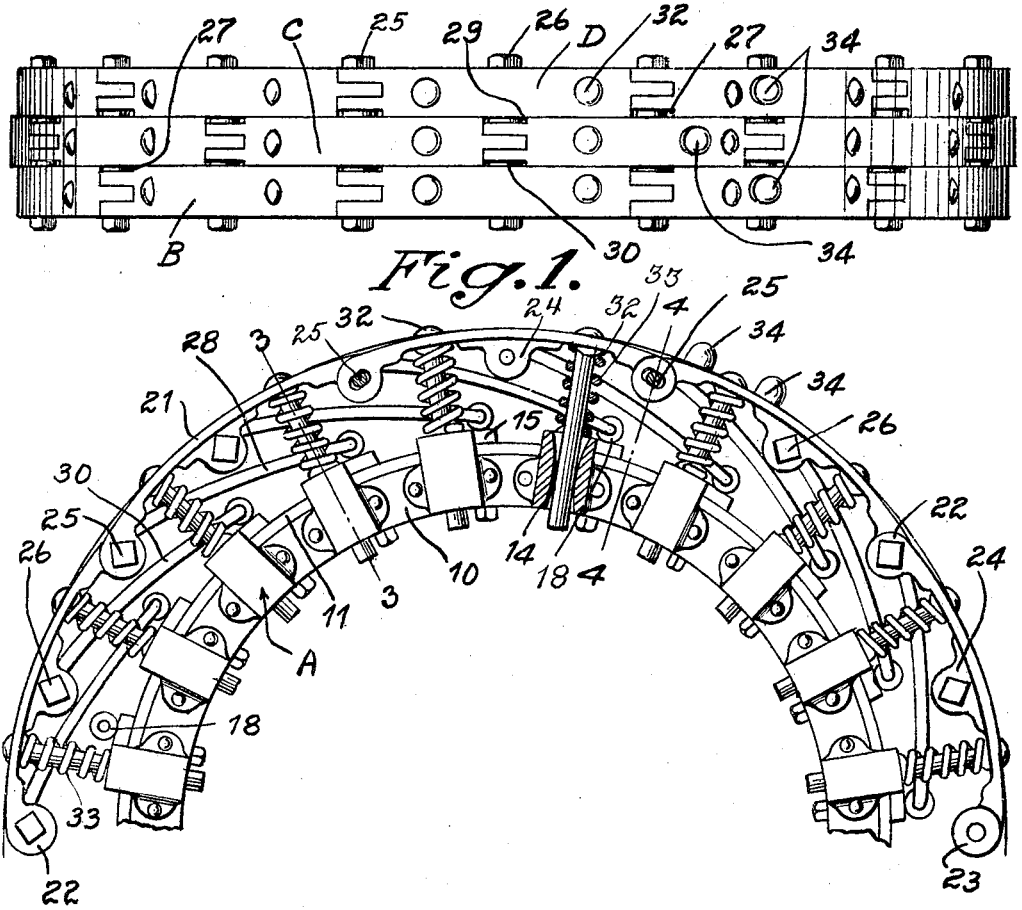
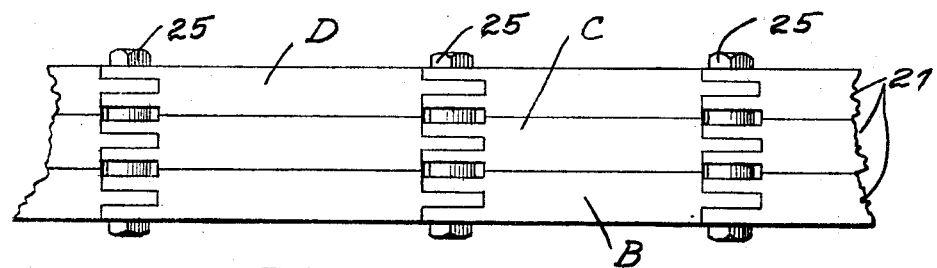

UNITED STATES PATENT OFFICE.

GEORGE W. VAN STEENBURGH, OF MANORKILL, NEW YORK.

SPRING-TIRE.

1,103,445.

Specification of Letters Patent. Patented July 14, 1914.

Application filed March 6, 1913. Serial No. 752,483.

*To all whom it may concern:*

Be it known that I, GEORGE W. VAN STEENBURGH, a citizen of the United States, residing at Manorkill, in the county of Schoharie, State of New York, have invented certain new and useful Improvements in Spring-Tires; and I do hereby declare the following to be a full, clear, and exact description of the invention, such as will enable others skilled in the art to which it appertains to make and use the same.

This invention relates to spring tires.

The object of the invention resides in the provision of a spring tire which may be readily associated with an ordinary wheel and when so associated will efficiently absorb the shocks and jars incident to travel and thereby enhance the comfort of the occupants of the vehicle.

A further object of the invention resides in the provision of a spring tire which will be strong, durable and efficient in use.

With the above and other objects in view the invention consists in the details of construction and in the arrangement and combination of parts to be hereinafter more fully described and particularly pointed out in the appended claims.

In describing the invention in detail reference will be had to the accompanying drawings wherein like characters of reference denote corresponding parts in the several views, and in which—

Figure 3:
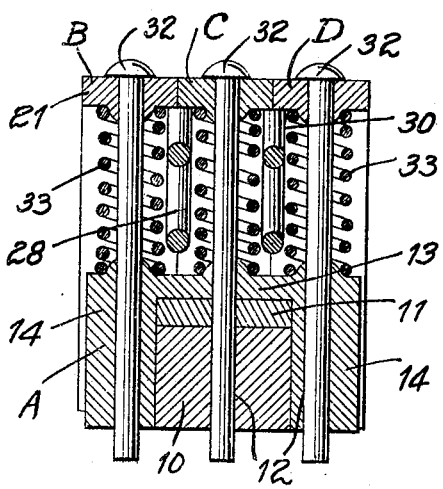
Figure 4:
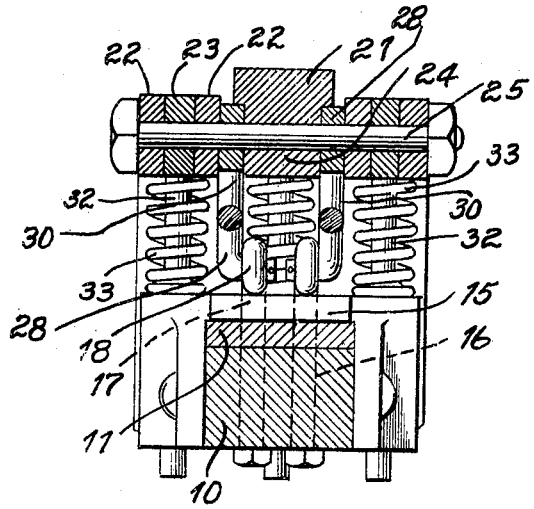
Figure 6:
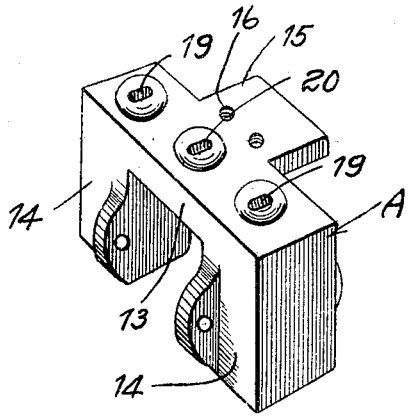
Figure 5:
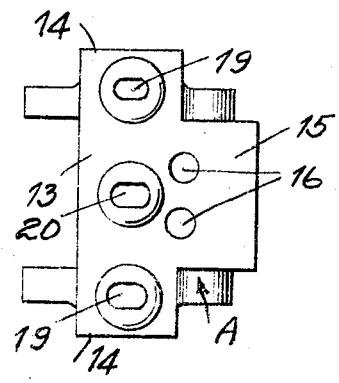
Figure 7:
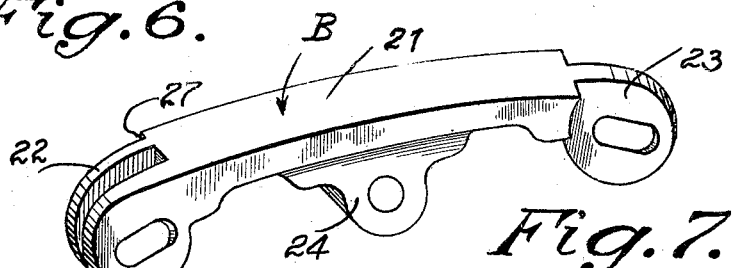

Figure 1 is a plan view of a spring tire constructed in accordance with the invention; Fig. 2, a side elevation of a fragment of same applied to the felly of a wheel; Fig. 3, a section on the line 3—3 of Fig. 2; Fig. 4, a section on the line 4—4 of Fig. 3; Fig. 5, a top view of one of the fastening blocks employed to receive the tire to a felly; Fig. 6, a detail perspective of one of the fastening blocks; Fig. 7, a detail perspective view of one of the sections which make up the tread of the tire, and Fig. 8, a plan view showing a slightly modified form of tire.

Referring to the drawings 10 indicates the felly of an ordinary wheel which is provided with the usual flat metal rim 11. A plurality of radial passages 12 extend through the felly 10 and rim 11 for a purpose that will presently appear. Secured to the felly 10 in embracing relation to the latter are a plurality of U-shaped securing blocks A each of which includes a bight portion 13 and arms 14, the bight portion 13 extending across the rim 11 and engaging the latter. This bight portion 13 of each securing block is provided with a lateral extension 15 which rests upon rim 11. Extending radially through the felly 10, rim 11 and bight portion 13 of each securing block are transversely alined passages 16 in which are engaged respectively bolts 17 the outer ends of which terminate in eye members 18. Extending radially through the arms 14 of each securing block are passages 19 respectively, while the bight portion 13 of each securing block is provided with an opening 20 which alines with a respective passage 12. The opening 20 and passage 12 and the passages 19 are all substantially elliptical in cross section so that bolts or pins disposed therethrough will be capable of a certain amount of circumferential play. Surrounding the felly 10 in spaced relation thereto is a rim formed of a plurality of annular members B, C and D arranged side by side. Each of these annular members B, C and D is formed of a plurality of corresponding sections 21 which terminate at one end in perforated spaced ears 22 at their other end in a single perforated ear 23. Each of the sections 21 is provided on its inner side with a central perforated ear 24. The sections 21 of the members B and D are correspondingly disposed while the sections 21 of the members C are disposed in staggered relation with respect to the sections 21 of the members B and D. In assembling the rim the ear 23 of each section 21 is disposed between the ears 22 of the adjacent section and a bolt 25 is passed through the interlocking ears of the sections 21 of the members B and D and through the ears 24 of the sections 21 of the member C. Other bolts 26 are then engaged through the interlocking ears 22 and 23 of the sections 21 of the member C and also through the ears 24 of the sections 21 of the members B and D. By this construction it will be apparent that the members B, C and D are all united to form a single rim. The inner ear 22 of each section 21 of the members B and D is cut away as at 27 so as to leave an open space into which projects one end of a tie rod 28 which is pivoted upon the adjacent bolt 25, there being two of these tie rods pivotally engaged with each bolt 25. The other ends of these rods are pivotally engaged respectively with the eye members 18 of the bolts 17 carried by alternate secured blocks A.

The ears 22 of the sections 21 of the member C are cut away on their outer sides as at 29 and disposed in the openings left by these cut away portions are the ends of tie rods 30 which are pivoted upon respective bolts 26 at one end and pivotally connected to respective eye members 18 of the bolts 17 carried by alternate securing blocks A. Carried by the sections 21 of the members B, C and D are spaced series of bolts 32, the bolts of each series being arranged in transverse alinement and passing respectively through the alined passages 19 and through the continuous passage formed by the opening 20 and the passage 12. As the passages 19 and the opening 20 and passage 12 are elliptical in cross section and in addition are flared at each end and loosely fit the bolts 32 it will be obvious that the tread 21 is permitted to move radially inwardly. Surrounding each bolt 32 and having one end bearing against a respective section 21 and its other end bearing against a securing block A is a spiral spring 33 which acts as a cushion during the use of the tire. The sections 21 of the members B, C and D are provided on their outer sides at suitable spaced points with cleats 34 which serve to prevent slipping of the tire from the engaged surface during use.

In the modified form illustrated in Fig. 8 the sections 21 of the members B, C and D are all arranged correspondingly so that the bolts 25 serve to secure the sections 21 of all members together and the use of the bolts 26 consequently dispensed with.

What I claim is:—

1. The combination of a felly provided with radial passages, a plurality of U-shaped securing blocks embracing the felly and provided respectively with openings in their bight portions registering with the passages in the felly and further provided with radial passages in respective arms, a rim encircling the felly and formed of a plurality of annular members each of which comprises a plurality of hingedly connected sections, means for securing said annular members against lateral movement with respect to each other, bolts carried by the sections of said annular members and slidably engaged through the passages in said securing blocks and through the registering openings and passages of the securing block and felly respectively, and springs encircling each of said bolts having their terminals in engagement respectively with the securing blocks and the sections of the annular members.

2. The combination of a felly provided with radial passages, a plurality of U-shaped securing blocks embracing the felly and provided respectively with openings in their bight portion registering with the passages in the felly and further provided with radial passages in respective arms, a rim encircling the felly and formed of a plurality of annular members each of which comprises a plurality of hingedly connected sections, means for securing said annular members against lateral movement with respect to each other, bolts carried by the sections of said annular members and slidably engaged through the passages in said securing blocks and through the registering openings and passages of the securing block and felly respectively, and tie rods having one end pivotally connected to the rim and their other ends pivotally connected to the securing blocks.

In testimony whereof, I affix my signature, in the presence of two witnesses.

GEORGE W. VAN STEENBURGH.

Witnesses:
NELIA CHRISTIAN,
H. C. MAKELY.